Patented June 20, 1933

1,914,774

UNITED STATES PATENT OFFICE

FRANCIS X. GOVERS, OF VINCENNES, INDIANA, ASSIGNOR TO INDIAN REFINING COMPANY, OF LAWRENCEVILLE, ILLINOIS, A CORPORATION OF MAINE

METHOD OF COATING VESSELS

No Drawing. Application filed June 10, 1931. Serial No. 543,390.

This invention relates to an improved method of applying protective coating materials to the surfaces of vessels or other articles.

The invention broadly contemplates the application of a protective coating to surfaces of vessels, such as reaction vessels used in the cracking of hydrocarbon oils, for example, which are exposed to corrosive agencies or other influences tending to exert a deteriorating effect thereupon, by disposing a layer or film of the coating material, while in a fluid condition, over the surfaces to be protected, heating the vessel to a temperature at which the disposed coating material is in a semi-plastic condition, and then exerting a fluid pressure upon the disposed coating material within the vessel to produce an evenly distributed impervious coating which adheres uniformly and tenaciously over the entire surface.

In the past, it has been attempted to protect the surfaces of vessels, containers, and the like, exposed to corrosive or deteriorating influences by spraying them with molten metal or alloys resistant to such corrosive attack. The resulting coatings of sprayed metal have been generally unsatisfactory, however, largely due to the fact that it is impossible by spraying alone to obtain a coating which adheres tenaciously and uniformly over the entire surface, and also to the fact that such coatings are frequently of non-uniform thickness, exhibiting numerous thin or porous spots.

I have discovered that by disposing the metallic coating material in a film or relatively thin layer, as by spraying while in a molten condition, then after heating the vessel to approximately the temperature at which the sprayed metal softens or reaches a plastic or semi-plastic condition, exerting a relatively high fluid pressure upon it, I am able to obtain an extremely satisfactory coating evenly distributed and adhering tightly and uniformly over the entire surface of the vessel. The resulting coating, which is free from seams and thin spots is not only denser but thinner than the coating ordinarily obtained by merely spraying, for example. Moreover, I am able to obtain a very satisfactory and completely effective bond between the coating material and the surface to which it is applied.

It is advantageous to thoroughly clean the surface of the vessel prior to the application of the material and this may be accomplished, for example, by blasting it with sand in order to remove scale and other foreign impurities so as to present a clean surface, and which may be slightly roughened if desired, depending upon the coarseness of the sand used in the cleaning operation, since such roughening may facilitate the better adherence of the coating material to the surface. The temperature to which the vessel is heated after the application of the coating material and the subsequent degree of fluid pressure exerted thereupon depends upon the characteristics and properties, such as compressibility, fluidity and melting point of the coating material being employed. For example, when using lead as the coating material, the vessel to which it has been applied may be heated to temperatures ranging from 300° F. to about 500° F., while the fluid pressure exerted thereupon may range from 750 to 1200 pounds per square inch, or even higher, if desired.

As a specific example, I have satisfactorily coated the interior of a vessel with lead in the following manner. The inner surface of the vessel was subjected to cleaning by sandblasting so as to present a surface adapted to receive the molten lead. A layer of lead of about 1/8" thickness was applied thereto by spraying, with a suitable spraying machine, adapted to atomize and spray molten metal, as, for example, after the manner described in U. S. Patent No. 1,128,058, issued to M. U. Shoop. After the coating of lead had been applied to the entire inner surface of the vessel, the openings or manholes in the vessel were tightly closed and the vessel then heated to about 350° F., following which an inert gas, such as air or flue gas which had been preheated to approximately the same temperature, was introduced to the interior of the vessel under sufficient pressure to exert a pressure of approximately 1200 pounds per square inch upon the coating material. At this temperature, the lead was in such a mutable or plastic condition that under the pressure imposed thereupon, it was caused to flow, being forced into the pores of the vessel surface to form a tenacious bond therewith and at the same time distributing itself evenly and uniformly thereover.

While I have described, first, applying the coating material by spraying and then heating the vessel to a temperature at which the sprayed metal attains a mutable or semi-plastic condition, it may be of advantage to maintain the vessel at a suitable temperature during the application of the coating metal by spraying so that its solidification is delayed to such an extent that when the fluid pressure is exerted thereon, it is still in a semi-plastic condition.

In the case of small vessels, such as pipes or conduits, where the application of the coating metal by spraying may be practically precluded, the coating metal may be run into the pipe while in a fluid condition until the pipe is full or, on the other hand, a smaller amount may be run in and the pipe subjected to rotation or movement in such a way as to dispose a film of the molten metal over the entire inner surface, following which the remaining fluid metal may be displaced and, after closing the openings in any suitable manner, a gas or other inert fluid under pressure is introduced to the pipe to exert sufficient pressure therein to convert the film of coating material into a uniformly thin but dense coating.

While the above example illustrates the application of the invention to the coating of vessels with lead, it is equally well adapted to the application of various metallic coating materials as, for example, in the coating of reaction vessels used in the cracking of hydrocarbon oils with metals or alloys, such as chromium, which are resistant to the attack of sulphur.

Obviously many modifications and variations of the invention, as hereinbefore set forth, may be made without departing from the spirit and scope thereof, and therefore only such limitations should be imposed as are indicated in the appended claims.

I claim:

1. A method of coating the interior surfaces of steel vessels with a uniformly thin protective metallic coating material which comprises sandblasting the interior of the vessel to remove scale and present a surface adapted to receive the coating material, applying a layer of the coating material to said surface by spraying, subsequently heating the vessel to effect a semi-plastic condition of the sprayed material, and introducing heated inert fluid under pressure to the vessel to exert pressure upon the semi-plastic coating material and thereby form an evenly distributed impervious coating adhering uniformly and tightly over the surface of the vessel.

2. A method of coating the interior surfaces of steel vessels with a uniformly thin protective coating of lead which comprises sandblasting the interior of the vessel to remove scale and present a surface adapted to receive the lead, applying the molten lead to the surface by spraying, subsequently heating the vessel to effect a semi-plastic condition of the sprayed lead, and introducing heated inert gas under pressure to the interior of the vessel to exert pressure upon the semi-plastic lead and thereby form an evenly distributed impervious coating adhering uniformly and tightly over the surface of the vessel.

3. A method of coating the interior surfaces of steel vessels with a uniformly thin protective coating of lead which comprises sandblasting the interior of the vessel to remove scale and present a surface adapted to receive the lead, applying the molten lead to the surface by spraying, subsequently heating the vessel to about 350° F. in order to maintain the sprayed lead in a semi-plastic condition, and applying a gaseous pressure to the interior of the sprayed vessel of from about 750 to 1200 pounds per square inch to form the sprayed lead into an evenly distributed impervious coating adhering uniformly and tightly over the surface of the vessel.

4. A method of coating the surfaces of steel vessels with a uniformly thin protective coating material which comprises disposing a film of the molten material over said surfaces, subsequently heating the vessel to effect a semi-plastic condition of the film, and then applying a gas pressure upon the film of coating material to form said film into an evenly distributed, impervious coating adhering uniformly and tightly over the surface of the vessel.

In witness whereof I have hereunto set my hand this 4th day of June, 1931.

FRANCIS X. GOVERS.